United States Patent [19]

Zitka et al.

[11] Patent Number: 4,982,801
[45] Date of Patent: Jan. 8, 1991

[54] FLEXIBLE COUPLING FOR DOWNHOLE MOTOR

[75] Inventors: Mark D. Zitka; Gary Wells, both of Lafayette, La.

[73] Assignee: Teleco Oilfield Services Inc., Meriden, Conn.

[21] Appl. No.: 293,514

[22] Filed: Jan. 4, 1989

[51] Int. Cl.⁵ .............................................. E21B 3/00
[52] U.S. Cl. ..................................... 173/163; 464/155
[58] Field of Search ................ 173/163, 164; 175/107; 464/18, 106, 155

[56] References Cited

U.S. PATENT DOCUMENTS 4,729,675  3/1988  Trzeciak et al. ................ 175/107 X Primary Examiner—Douglas D. Watts
Assistant Examiner—Willmon Fridie, Jr.
Attorney, Agent, or Firm—Fishman, Dionne & Cantor

[57] ABSTRACT

A flexible coupling for use in a down-hole motor assembly such as a positive displacement moineau motor is presented. The flexible coupling includes two sets of flexible joints. Each joint consists of two cylindrically shaped slipper couplings angularly offset by 90 degrees. Each slipper coupling is comprised of mating male and female members which are joined together by ball bearings positioned in arcuate grooves located along the cylindrical mating surface.

18 Claims, 3 Drawing Sheets

FLEXIBLE COUPLING FOR DOWNHOLE MOTOR

BACKGROUND OF THE INVENTION:

This invention relates generally to downhole motors used in drilling the bore of a subterranean well. More particularly, this invention relates to a new and improved flexible coupling used to interconnect and transmit movement between the rotor and drive shaft of a downhole motor.

Drill apparatus wherein a drill bit is operated by a downhole motor, such as positive displacement fluid motors or turbine driven motors, are well known in the prior art. In such motors, the drill bit is rotated by a rotor being turned by flow of fluid, such as drilling fluid through the motor assembly. A downhole motor of this type which utilizes a positive displacement Moineau motor is disclosed in U.S. Pat. No. 4,729,675 which is assigned to Teleco Oilfield Services, Inc., the assignee hereof. The downhole motor of U.S. Pat. No. 4,729,675 is commerically marketed under the trademark MAGNA-DRILL.

Downhole motors include a connecting rod which functions to transmit the motion from a rotor or turbine to a drive shaft. In the case of a positive displacement motor of the type disclosed in U.S. Pat. No. 4,729,675, the connecting rod must transmit and convert eccentric motion from the rotor to rotary motion of the drive shaft. This means that the connecting rod must compensate for angular misalignment between the rotor and drive shaft. In U.S. Pat. No. 4,729,675, this compensation is effected by a rod which includes opposed upper and lower universal joints. However, while suitable for its intended purposes, there is a continuing need for improved connecting rods capable of reliable high torque transmission between rotor and drive shaft for extended periods of time.

SUMMARY OF THE INVENTION:

The above-discussed and other drawbacks and deficiencies of the prior art are overcome or alleviated by the flexible coupling for use in a down-hole motor assembly of the present invention. In accordance with the present invention, a flexible coupling is provided comprising two sets of flexible joints that compensate for angular misalignment of the rotor and drive shaft in the motor assembly. Each set of flexible joints includes two cylindrically shaped slipper couplings angularly offset from each other by 90 degrees. Each slipper coupling provides flexibility in a single plane so that the two slipper coupling$ making up a flexible joint permit flexibility in two transverse planes. The two sets of flexible joints thus permit joint flexibility during all angles of shaft rotation.

Each slipper coupling is comprised of tight fitting cylindrical male and female members which are joined together with ball bearings positioned in arcuate grooves located in the cylindrical mating surfaces. Bearings are installed through holes on the exterior of the coupling connection and are retained in the grooved cavities with threaded plugs.

The flexible coupling of the present invention is capable of reliable high torque transmission between the rotor and drive shaft for extended periods. Another important feature of the present invention is that it consists of only five assembled parts; and of those parts, only three are different from each other. In accordance with still another feature of this invention, it is possible to replace only worn components and reuse undamaged portions.

The above-discussed and other features and advantages of the present invention will be apparent to those of ordinary skill in the art from the following detailed description and drawings.

BRIEF DESCRIPTION OF THE DRAWINGS:

Referring now to the drawings, wherein like elements are numbered alike in the several FIGURES.

Figure 5:
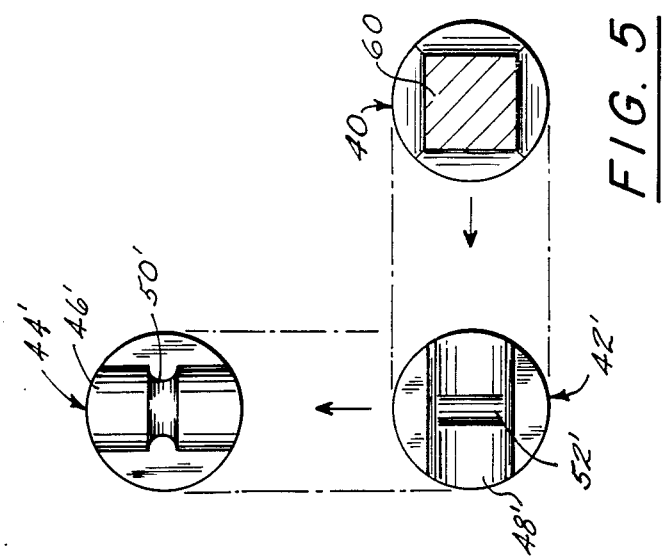
FIG. 5 is a cross-sectional elevation view along the line 5—5 of FIG. 2 which also depicts end views of components of the flexible coupling of FIG. 2.
Figure 4:
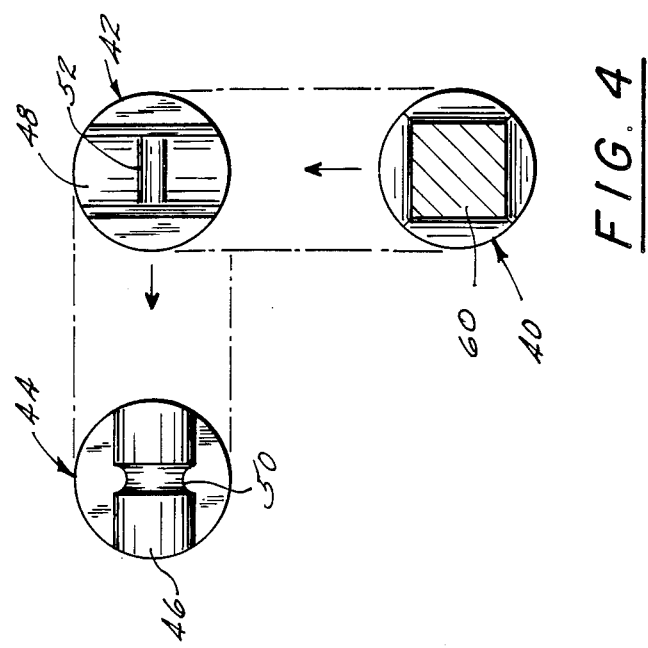
FIG. 4 is a cross-sectional elevation view along the line 4—4 of FIG. 2 which also depicts end views of components of the flexible coupling of FIG. 2.
Figure 1:
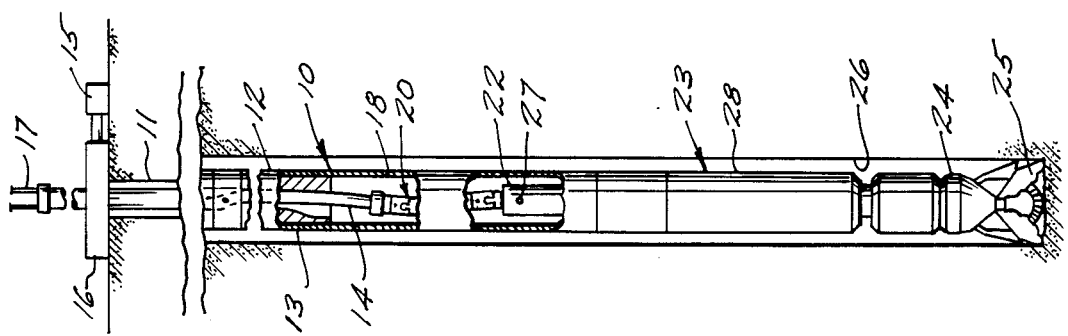
FIG. 1 is a side view, partly in cross-section, of a down-hole motor assembly employing the flexible coupling of the present invention.
Figure 3:
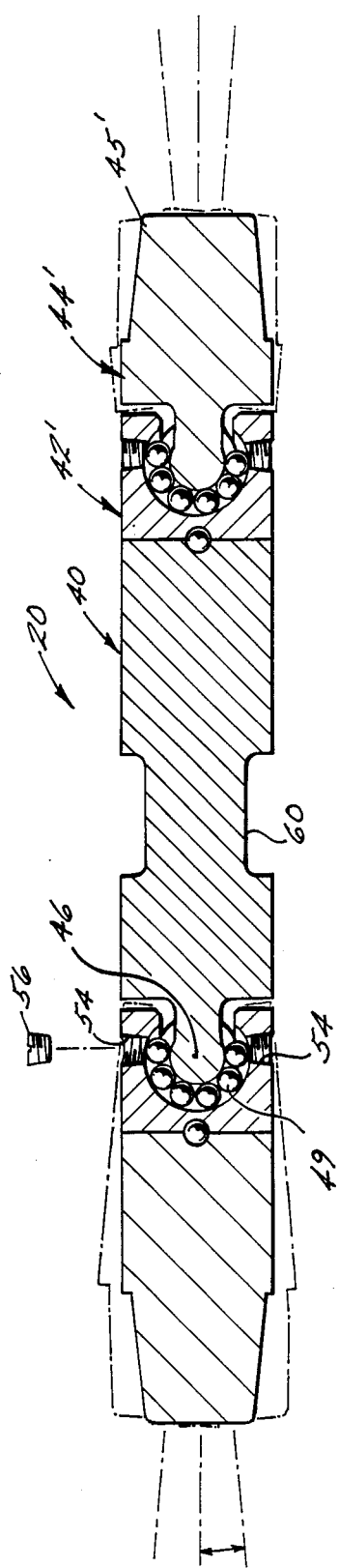
FIG. 3 is a cross-sectional elevation view along the line 3—3 of FIG. 2.

DESCRIPTION OF THE PREFERRED EMBODIMENT:

Referring first to FIG. 1, there is shown a downhole motor assembly 10 which is connected to the lower end of a string of drill pipe 11 which conducts drilling fluid through the motor assembly and into the borehole. Motor assembly 10 has a housing 12 in which there is secured a hollow, fixed stator 13.

In the embodiment shown in FIG. 1, motor assembly 10 is a positive displacement motor such as a Moineau type fluid motor having a helicoid progressing cavity. A rotatable helicoidal rotor 14 is positioned in stator 13 and rotated in response to drilling fluid flowing through the stator. As noted, the motor which is illustrated is a positive displacement fluid motor of a well known commercially available type. Obviously, other types of fluid operated motors can be used, especially fluid turbine operated motors, sometimes known as turbodrills. The rotor is driven by the downward flow of drilling fluid which is supplied to the drill pipe 11 by a pump 15. Pump 15 is located on a conventional drilling rig having a rotary table 16 which rotates pipe 11 in the drill rig.

The drilling fluid flows through the apparatus in a downward direction through a connecting rod housing section 18. Connecting rod housing section 18 encloses the flexible coupling 20 of the present invention which is connected to the lower end of rotor 15 and to the upper end of a drive shaft 22.

The drive shaft 2 extends downwardly through and is rotatably supported in a bearing assembly 23. Drive shaft 22 is hollow in construction and has a drill bit 24 at its lower end which may have conventional rolling cutters 25 for drilling through an earth formation to form a borehole 26.

The drill shaft 22 is tubular in shape and has inlet ports 27 at its upper end. The drilling fluid passes from the connecting rod housing 18 through the inlet ports 27 into the elongated central bore of the drive shaft. The fluid passing through the drive shaft exits from the drill bit 24 to flush cuttings from the borehole 26 and to further cool the bit.

During operation of the fluid motor 10, the lower end of rotor 14 has an eccentric motion which is transmitted to drive shaft 22 by the flexible coupling 20. Drive shaft 22 therefore revolves about a fixed axis within the outer housing structure 28 of the bearing assembly 23. The drive shaft 22 is supported within the housing by bearing means such as shown and described in aforementioned U.S. Pat. No. 4,729,675.

Turning now to FIGS. 2–7, the flexible coupling of the present invention is shown generally at 20. Flexible coupling 20 is comprised of five interlocking sections including a central section 40, a pair of intermediate sections 42 and 42' attached to either end of central section 40 and a pair of end or outer sections 44 and 44' attached at the respective ends of intermediate sections 42 and 42'. It will be appreciated that intermediate sections 42, 42' and end sections 44, 44' are all identical on both the left and right hand sides of central support 40 with the difference that sections 42' and 44' are offset with respect to sections 42 and 44 by 90 degrees. Central section 40 and sections 42 and 44 together define a first flexible joint, while central section 40 and sections 42' and 44' define a second flexible joint.

Each of these flexible joints are comprised of two cylindrically shaped slipper couplings or slip joints which are angularly offset from an adjacent joint by 90 degrees and with each slipper coupling providing flexibility in a single plane. Thus, in FIGS. 2 and 3, four slipper couplings are identified at A, B, C and D. Slipper couplings A and B are angularly offset from one another and define a first flexible joint; while slipper couplings C and D are angularly offset from one another and define second flexible joint. In addition, couplings B and C are also offset 90 degrees from each other. This offset combination of slipper couplings A, B, C and D permits joint flexibility during all angles of shaft rotation.

Figure 2:
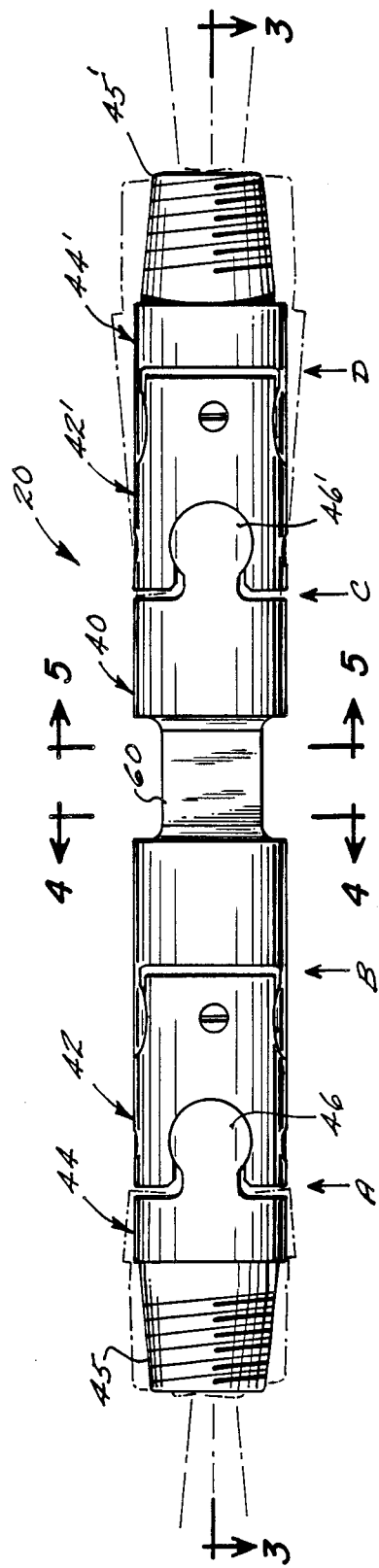
FIG. 2 is a side elevation view of the flexible coupling of the present invention.
Figure 7:
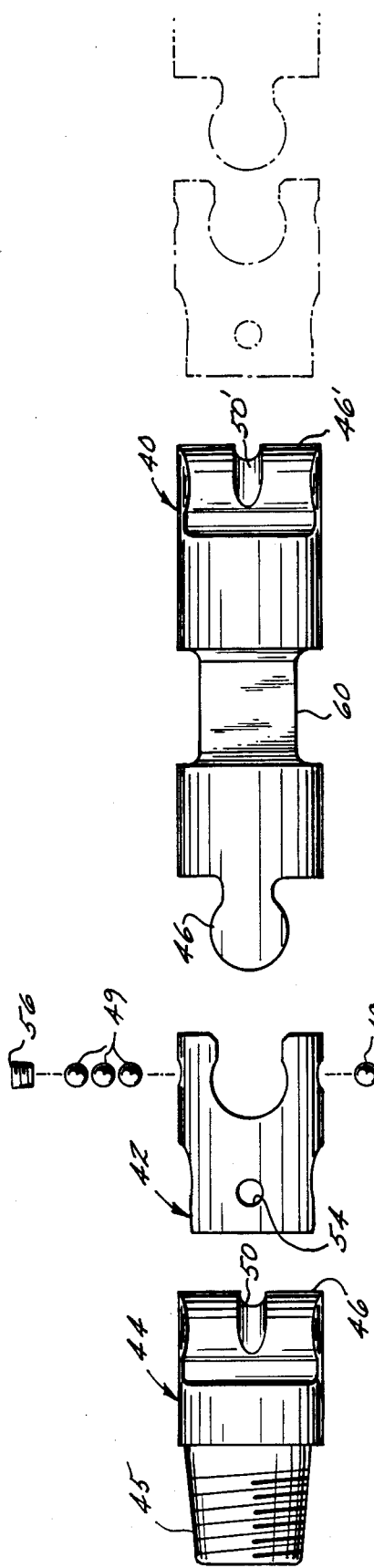
FIG. 7 is a partial exploded view of the flexible coupling of FIG. 6, rotated 90 degrees.
Figure 6:
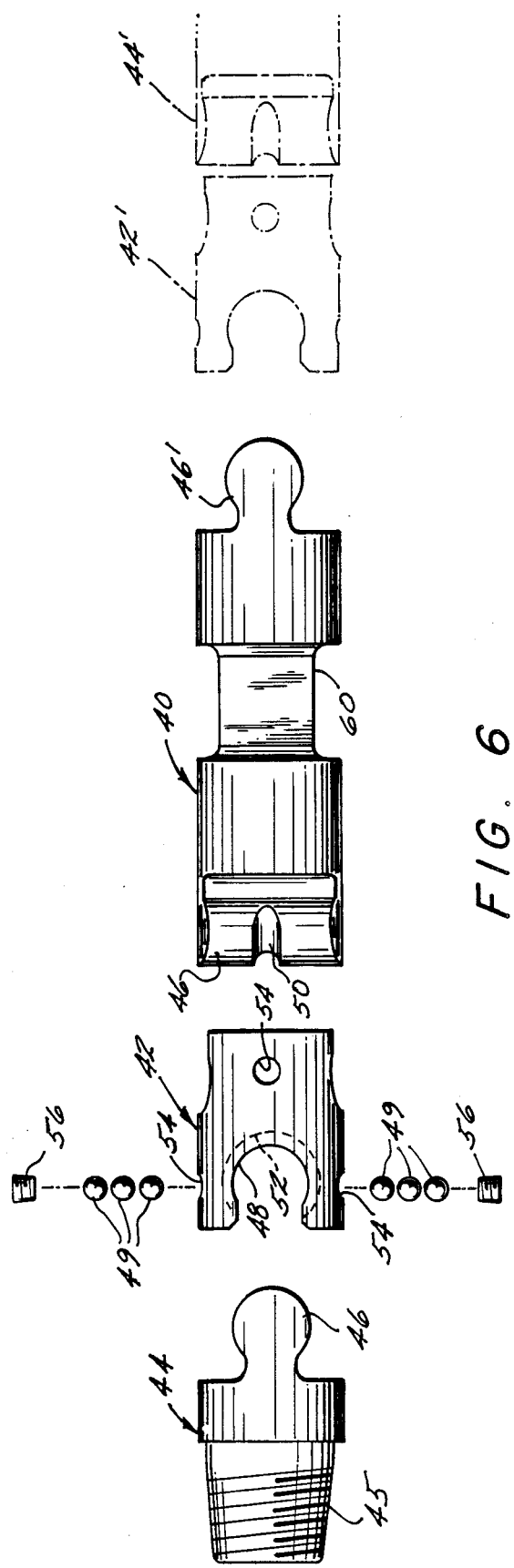
FIG. 6 is a partial exploded view of the flexible coupling of FIG. 2.

The specific construction of the slipper joint will now be discussed with regard to the left side of FIG. 2 (that is items 42 and 44), bearing in mind that the right side of FIG. 2 (items 42' and 44') are identical and so a discussion thereof would be only duplicative. Referring now to FIGS. 2–7, each slipper coupling A and B is defined by a male member 46 and a female member 48 which are joined together with a plurality of ball bearings 49 (preferably 6) positioned in grooves located in the mating surfaces of the male and female members 46 and 48. It will be appreciated that male and female members 46 and 48 have a cylindrical outer surface and are designed to define a tight interfit therebetween. A groove 50 is located in each male member 46 while an identical groove 52 is located in each female member 48. Grooves (46) and (48) are shown clearly in FIGS. 4 and 5 which depict end views of sections 42, 44, 42' and 44'. Grooves 50 and 52 are semi-circular in cross-section and have an arcuate or curved configuration along the length thereof which conforms to the curvature of the cylindrical mating surfaces of male and female members 46 and 48.

When male and female members 46 and 48 are mated, semi-circular grooves (48) and (50) will define a circular cavity for retaining ball bearings 49. Bearings 49 are installed through opposed threaded openings 54 in intermediate section 42. It will be appreciated that openings 54 intersect and communicate with interior curved grooves 52 in each intermediate section 42. After the bearings 49 have been installed through openings 54 and are seated in the cavity defined by grooves (48) and (50), threaded plugs 56 are threaded into openings 54 to retain ball bearings 49 within grooves (48) and (50).

As mentioned, each flexible joint (on either side of central section 40) is comprised of two slipper couplings A, B and C, D composed of the interlocking male and female members. In turn, each slipper coupling is offset 90 degrees from an adjacent slipper coupling. This is accomplished by orienting female members 48 in intermediate section 42 transverse to one another; and orienting corresponding male members 46 in end section 44 and central section 40 transverse from each other. As a result, each slipper coupling A and B will have flexibility in one plane, but by rotationally positioning the adjacent second coupling 90 degrees from the first, the combined joint A and B will be free to flex in both of the individual slipper coupling planes. Moreover, with the addition of the two slipper couplings C and D on the other side of central section 40, (which are similarly offset 90 degrees from each other and 90 degrees from the first joint), the flexible coupling 20 obtains 360 degrees of flexibility. Such flexibility is indicated by the dot and dash lines in FIGS. 2 and 3 wherein flexible coupling 20 is moved from a linear configuration in the solid lines to a flexed configuration in the dot and dash lines.

It will be appreciated that while each slipper coupling has been depicted utilizing a single pair of grooves (48) and (50), the present invention contemplates any number of grooves receiving ball bearings for effecting the flexed joint. Similarly, while the present invention has been depicted utilizing six ball bearings, any number of ball bearings may be used herein.

Each end section 44, 44' terminates in a tapered threaded section 45, 45', respectively. Threaded sections 45, 45' connect the flex coupling to the rotor and drive shaft, respectively.

Central section 40 has a center portion 60 of reduced diameter and torquing flats that provide a means of attachment for related equipment necessary to rotate or restrain the coupling while it is threaded to the drive shaft cap (not shown) and rotor. The drive shaft cap provides a means of flex coupling attachment to the drive shaft and also channels drilling fluid through several parts into the drive shaft's internal diameter.

The flexible coupling of the present invention utilizes only five assembled parts and of those five parts only three have distinct configurations. Such construction leads to low cost manufacturing and assembly. In addition, great flexibility is possible in the selection of materials and hard coatings for the flexible coupling components. An important feature of the present invention is that it is very easy to replace one component while retaining undamaged portions. For example, should one of the end sections 44, 44' of flexible coupling 20 be damaged, the entire flex coupling may be easily repaired by the mere exchange of the damaged end section 44 for a new end section 44 without the need for a completely new flexible coupling. Similarly, the ball bearings are easily removed in exchange for new ball bearings in the event of failure.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A flexible coupling for use in a downhole motor comprising:
   a central shaft section having opposed first and second ends and having a longitudinal central axis;
   a first intermediate shaft section having opposed first and second ends;
   a second intermediate shaft section having opposed first and second ends;
   a first outer shaft section having opposed first and second ends;
   a second outer shaft section having opposed first and second ends;
   a first joint pivotably interconnecting said first end of said central shaft section to said first end of said first intermediate shaft section, said pivotal interconnection of said first joint being along a first plane passing through said longitudinal axis of said central shaft;
   a second joint pivotably interconnecting said second end of said first intermediate shaft section to said first end of said first outer shaft section, said pivotal interconnection of said second joint being along a second plane passing through said longitudinal axis of said central shaft, said first plane being offset 90 degrees from said second plane;
   a third joint pivotably interconnecting said second end of said central shaft section to said first end of said second intermediate shaft section, said pivotal interconnection of said third joint being along a third plane passing through said longitudinal axis of said central shaft; and
   a fourth joint pivotably interconnecting said second end of said second intermediate shaft section to said first end of said second outer shaft section, said pivotal interconnection of said fourth joint being along a fourth plane passing through said longitudinal axis of said central shaft, said third plane being offset 90 degrees from said fourth plane.

2. The coupling of claim 1 wherein:
   said second plane is offset 90 degrees from said fourth plane; and
   said first plane is offset 90 degrees from said third plane.

3. The coupling of claim 1 wherein:
   said first and second intermediate shaft sections have an identical configuration.

4. The coupling of claim 1 wherein:
   said first and second outer shaft sections have an identical configuration.

5. The coupling of claim 1 wherein at least one of said first, second, third and fourth joint means comprises:
   a male extension having a first cylindrical bearing surface,
   a female recess having a second cylindrical bearing surface, said female recess being configured to receive said male extension for mating rotation; and
   bearing means between said bearing surfaces of said male extension and female recess.

6. The coupling of claim 5 wherein said bearing means comprises:
   a first arcuate groove along said first bearing surface;
   a second arcuate groove along said second bearing surface, said first groove mating with said second groove to define an arcuate cavity; and
   ball bearing means in said arcuate cavity.

7. The coupling of claim 6 wherein:
   said first and second arcuate grooves are semi-circular in cross-section.

8. The coupling of claim 6 wherein at least one of said first and second intermediate shaft sections include a pair of opposed, offset female recesses and including:
   a pair of opposed openings through said intermediate shaft sections, said openings communicating with said arcuate cavity; and
   plug means in each of said openings.

9. The coupling of claim 8 wherein:
   said plug means are threadably received in said openings.

10. A downhole motor comprising:
    a tubular housing having an inlet and an outlet for flow of fluid therethrough;
    a stator supported in a fixed position in said housing;
    a rotor supported for rotary movement in said stator;
    a shaft operatively connected to said rotor and supported for rotary movement in said housing; and
    a flexible coupling connecting said shaft to said rotor, said flexible coupling including;
    a central shaft section having opposed first and second ends and having a longitudinal central axis;
    a first intermediate shaft section having opposed first and second ends;
    a second intermediate shaft section having opposed first and second ends;
    a first outer shaft section having opposed first and second ends;
    a second outer shaft section having opposed first and second ends;
    a first joint pivotably interconnecting said first end of said central shaft section to said first end of said first intermediate shaft section, said pivotal interconnection of said first joint being along a first plane passing through said longitudinal axis of said central shaft;
    a second joint pivotably interconnecting said second end of said first intermediate shaft section to said first end of said first outer shaft section, said pivotal interconnection of said second joint being along a second plane passing through said longitudinal axis of said central shaft, said first plane being offset 90 degrees from said second plane;
    a third joint pivotably interconnecting said second end of said central shaft section to said first end of said second intermediate shaft section, said pivotal interconnection of said third joint being along a third plane passing through said longitudinal axis of said central shaft; and
    a fourth joint pivotably interconnecting said second of said second intermediate shaft section to said first end of said second outer shaft section, said pivotal interconnection of said fourth joint being along a fourth plane passing through said longitudinal axis of said central shaft, said third plane being offset 90 degrees from said fourth plane.

11. The downhole motor of claim 10 wherein:
    said second plane is offset 90 degrees from said fourth plane; and
    said first plane is offset 90 degrees from said third plane.

12. The downhole motor of claim 10 wherein:
    said first and second intermediate shaft sections have an identical configuration.

13. The downhole motor of claim 10 wherein:

said first and second outer shaft sections have an identical configuration.

14. The downhole motor of claim 10 wherein at least one of said first, second, third and fourth joint means comprises:
   a male extension having a first cylindrical bearing surface;
   a female recess having a second cylindrical bearing surface, said female recess being configured to receive said male extension for mating rotation; and
   bearing means between said bearing surfaces of said male extension and female recess.

15. The downhole motor of claim 14 wherein said bearing means comprises:
   a first arcuate groove along said first bearing surface;
   a second arcuate groove along said second bearing surface, said first groove mating with said second groove to define an arcuate cavity; and
   ball bearing means in said arcuate cavity.

16. The downhole motor of claim 15 wherein:
   said first and second arcuate grooves are semi-circular in cross-section.

17. The downhole motor of claim 15 wherein at least one of said first and second intermediate shaft sections include a pair of opposed, offset female recesses and including:
   a pair of opposed openings through said intermediate shaft sections, said openings communicating with said arcuate cavity; and
   plug means in each of said openings.

18. The downhole motor of claim 17 wherein:
   said plug means are threadably received in said openings.

* * * * *

UNITED STATES PATENT AND TRADEMARK OFFICE
CERTIFICATE OF CORRECTION

PATENT NO. : 4,982,801

DATED : Jan. 8, 1991

INVENTOR(S) : Mark D. Zitka and Gary Wells

It is certified that error appears in the above-identified patent and that said Letters Patent is hereby corrected as shown below:

| | |
|---|---|
| Col. 1, line 52 | Delete "coupling$" and insert therefore --couplings--. |
| Col. 2, line 59 | Delete "2" and insert therefore --22--. |
| Col. 3, line 56 | Delete "(46) and (48)" and insert therefore--46 and 48--. |
| Col. 3, line 64 | Delete "(48) and (50)" and insert therefore--48 and 50--. |
| Col. 4, line 3-4 | Delete "(48) and (50)" and insert therefore--48 and 50--. |
| Col. 4, line 5 | Delete "(48) and (50)" and insert therefore--48 and 50--. |
| Col. 4, line 31-32 | Delete "(48) and (50)" and insert therefore--48 and 50--. |

UNITED STATES PATENT AND TRADEMARK OFFICE
CERTIFICATE OF CORRECTION

PATENT NO. : 4,982,801

DATED : Jan. 8, 1991

INVENTOR(S) : Mark D. Zitka and Gary Wells

It is certified that error appears in the above-identified patent and that said Letters Patent is hereby corrected as shown below:

Col. 5, line 56      Delete "," and insert therefore --; --.

Col. 6, line 53      After "said second" insert --end--.

Signed and Sealed this

Twenty-second Day of June, 1993

Attest:

MICHAEL K. KIRK

*Attesting Officer*      Acting Commissioner of Patents and Trademarks